US008718095B2

(12) United States Patent
He et al.

(10) Patent No.: US 8,718,095 B2
(45) Date of Patent: May 6, 2014

(54) METHOD FOR TRANSMITTING FRAME SEQUENCE NUMBER, NODE B AND SERVICE RADIO NETWORK CONTROLLER

(75) Inventors: Meifang He, Shenzhen (CN); Xiang Cheng, Shenzhen (CN); Yu Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 71 days.

(21) Appl. No.: 13/260,191

(22) PCT Filed: Jan. 19, 2010

(86) PCT No.: PCT/CN2010/070257
§ 371 (c)(1),
(2), (4) Date: Feb. 22, 2012

(87) PCT Pub. No.: WO2011/022953
PCT Pub. Date: Mar. 3, 2011

(65) Prior Publication Data
US 2012/0140751 A1 Jun. 7, 2012

(30) Foreign Application Priority Data
Aug. 24, 2009 (CN) .......................... 2009 1 0167546

(51) Int. Cl.
*H04W 92/00* (2009.01)
(52) U.S. Cl.
USPC ........... 370/473; 370/338; 370/474; 370/475; 370/476
(58) Field of Classification Search
USPC ................................ 370/473–476
See application file for complete search history.

(56) References Cited

U.S. PATENT DOCUMENTS

| 2009/0086659 A1 | 4/2009 | Pani et al. |
| 2009/0186624 A1 | 7/2009 | Cave et al. |
| 2012/0002610 A1 * | 1/2012 | Widegren et al. ............. 370/328 |

FOREIGN PATENT DOCUMENTS

| CN | 101374040 A | 2/2009 |
| EP | 1 901 494 A1 | 3/2008 |
| EP | 1901493 A1 | 3/2008 |
| WO | WO 2009/088858 A1 | 7/2009 |

OTHER PUBLICATIONS

International Search Report from International Application No. PCT/CN2010/070257 mailed Jun. 3, 2010.

* cited by examiner

*Primary Examiner* — Huy D Vu
*Assistant Examiner* — Teisha D Hall
(74) *Attorney, Agent, or Firm* — Knobbe, Martens Olson & Bear, LLP (57) ABSTRACT

The present invention discloses a method for transmitting a frame sequence number and a node B and a serving radio network controller, which method comprises: a node B receiving a protocol data unit from a carrier and de-multiplexing the protocol data unit into media access control data streams; the node B inserting a carrier symbol into a carrier indicator field of an enhanced-dedicated transport channel data frame and generating a frame sequence number for every the enhanced-dedicated transport channel data frame transmitted on the carrier; and the node B transmitting the media access control data streams to a serving radio network controller SRNC by using the enhanced-dedicated transport channel data frame. By virtue of the present invention it achieves that the SRNC is capable of obtaining the information regarding network layer data transmission in dual-carrier situation so as to detect the loss of data frames.

12 Claims, 11 Drawing Sheets

METHOD FOR TRANSMITTING FRAME SEQUENCE NUMBER, NODE B AND SERVICE RADIO NETWORK CONTROLLER

FIELD OF THE INVENTION

The present invention relates to the communication field, and in particular to a method for transmitting frame sequence numbers and a node B and a serving radio network controller.

BACKGROUND OF THE INVENTION

In the existing systems, the Enhanced-Dedicated Transport Channel (E-DCH) data frame belongs to the data frame type. It is used in the uplink direction, and is contained through high-layer signaling indicator. The E-DCH data frame is defined as two types of structures: type 1 and type 2. If it contains a media access control-enhanced sublayer protocol data unit (MAC-es PDU), then type 1 structure is used; and if it contains a media access control-improved sublayer protocol data unit (MAC-is PDU), then type 2 structure is used.

Figure 1A:
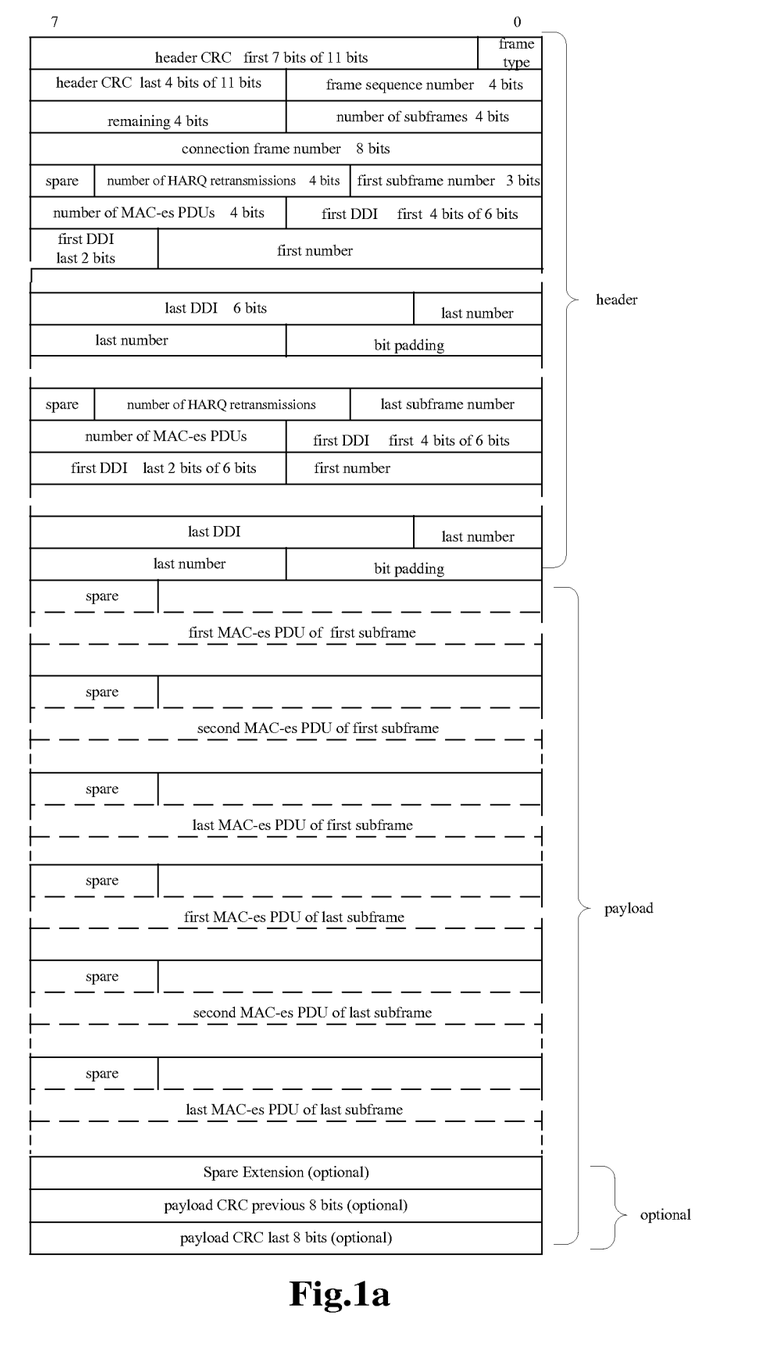
FIGS. 1a and 1b are schematic diagrams of the E-DCH uplink data frame format according to the relevant art.
Figure 1B:
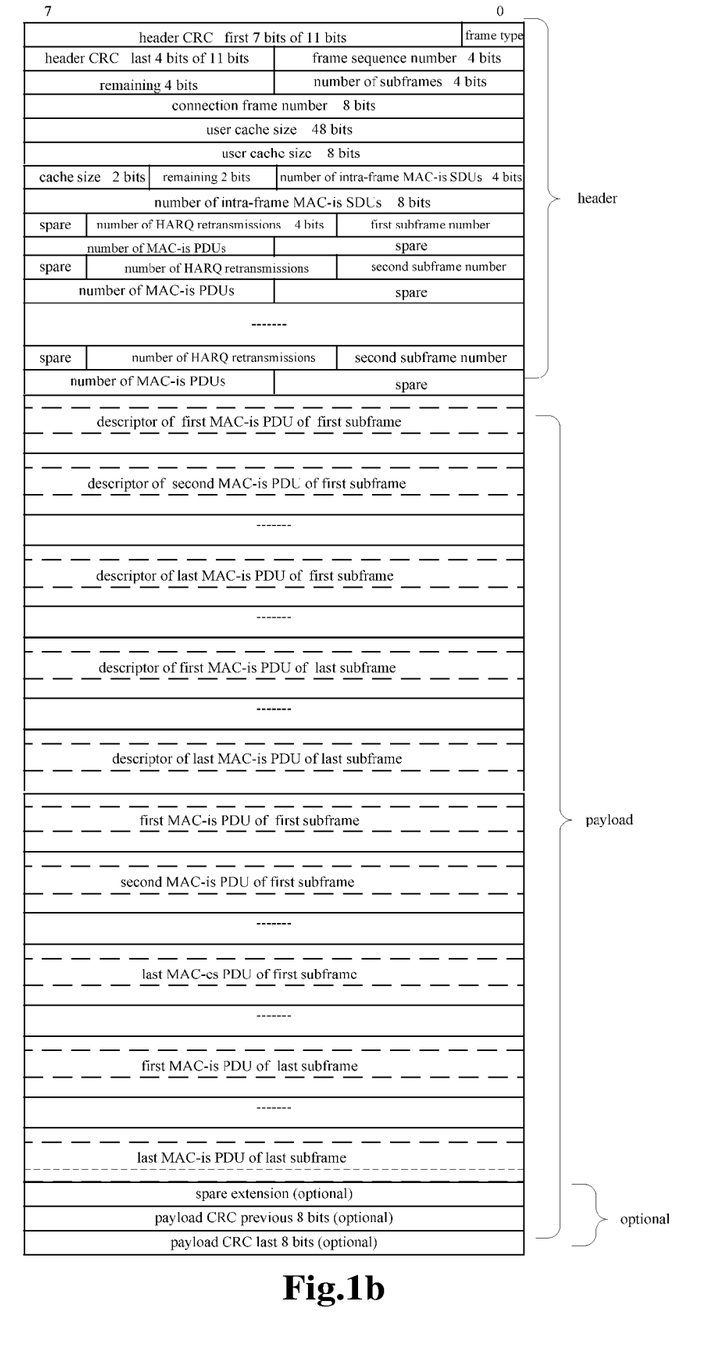

FIG. 1 is a schematic diagram of the format of the E-DCH uplink data frame in the conventional art.

As shown in FIG. 1, E-DCH data frame type 1 and type 2 contain two component parts: header and payload, with both of them containing the following several fields and the difference being that the included data units are different, as described in the above:

1. Header cyclic redundancy checksum (CRC) field:

The "CRC check code" field is the result of the CRC applied to the remaining part of the header (i.e. from bit 0 of the first byte to bit 0 (included) of the last byte of the header (not including the Header CRC Cont four bits)) with the corresponding generator polynomials. The length of the "header CRC check code" field used for an E-DCH uplink data frame is 7 bits or 11 bits. The 7 bits are bit 7 to bit 1 of the first byte of the frame header of the E-DCH data frame, and the 11 bits further contain bits from bit 7 to bit 4 of the second byte besides of the bits from bit 7 to bit 1 of the first byte;

2. Frame type indicator

The "frame type indicator" field is used to indicate whether a frame is a data frame or a control frame. The length of the "frame type indicator" field is one bit and it is located in bit 0 of the first byte of the frame header in the E-DCH data frame. The E-DCH data frame is an uplink data frame, and therefore, as described above, its "frame type indicator" field is "0";

3. Frame sequence number (FSN)

The "frame sequence number" field represents the FSN of an E-DCH data frame, and for each transmitted E-DCH data frame, it has to generate its own FSN. If the FSN is 4 bits, then it is calculated according to the following formula: FSN=(FSN+1) modulo 16.

The range of the FSN value is 0-15. The length of the "frame sequence number" field is 4 bits and it is located from bit 3 to bit 0 of the second byte of the frame header of the E-DCH data frame;

4. Number of subframes

The "number of subframes" field indicates how many subframes are in a frame. Please note that a subframe includes a header portion and a payload portion. The value range of the "number of subframes" field is 1-16, in which, the binary code of value 1 is "0000", and the binary code of value 16 is "1111". The length of the "number of subframes" field is 4 bits, and it is located from bit 3 to bit 0 of the third byte of the frame header of the E-DCH data frame;

5. Connection frame number (CFN)

For E-DCH, the "connection frame number" field indicates a radio frame that the HARQ decodes data accurately. For E-DCH, this field is used for the purpose of re-ordering, and CFN (and subframe number) can be used for dynamic delay measurements. The value range is 0-255. The length of the "connection frame number" field is 8 bits and it is located from bit 7 to bit 0 of the fourth byte of the frame header of the E-DCH data frame;

6. Number of HARQ Retransmissions

The "number of HARQ retransmissions" field indicates the number of HARQ retransmissions for successfully decoding the payload, or as to the HARQ decoding failure situation, this field indicates the number of HARQ retransmissions that were used at the time when the HARQ decoding failure is detected. And the value of this field being 13 indicates that the actual retransmitted data is inappropriate to be used as the input of the outer loop power control. The value of this field being 15 indicates that the node B is incapable of calculating the number of HARQ retransmissions. The value range is 0-15. The length of the "number of HARQ retransmissions" field is 4 bits and it is located from bit 3 to bit 0 of the fifth byte of the frame header of the E-DCH data frame; the "number of HARQ retransmissions" field of the first subframe number is located from bit 6 to bit 3 of the fifth byte of the frame header of the E-DCH data frame; the "number of HARQ retransmissions" field of the second subframe number is located from bit 6 to bit 3 of the first byte of the frame header of the E-DCH data frame after the first MAC-e header. The location of the "number of HARQ retransmissions" fields of other subframe numbers in the frame header of the E-DCH data frame can be deduced in the same manner, till this subframe includes the number of HARQ retransmissions of all the MAC-es PDUs;

7. Subframe number

The "subframe number" field indicates the subframe number in which the payload is received. Except for the purpose of re-ordering, the subframe number (and control frame number) may be used as dynamic delay measurement. The value range of the "subframe number" field is 0-4 and the length is 3 bits; the first subframe number is located from the bit 2 to the bit 0 of the fifth byte of the frame header of the E-DCH data frame; the second subframe number is located from the bit 2 to the bit 0 of the first byte after the first MAC-e or MAC-i header of the frame header of the E-DCH data frame; and other subframe numbers are located from the bit 2 to the bit 0 of the first byte after the previous MAC-e or MAC-i header of the frame header of the E-DCH data frame, till all the subframe numbers are included.

8. Spare extension

The "spare extension" field indicates the location where new Information Elements (IEs) can in the future be added in a backward compatible way. The length of this field is 0-32 bytes.

9. Payload CRC

The "payload CRC" field is the CRC check of the payload. It is the result of the CRC applied to the remaining portion of the payload, that is, from the bit 7 of the first byte of the payload to the bit 0 of the payload before the payload CRC. The length is 16 bits.

The E-DCH frame protocol provides the transmission of MAC-es PDUs or MAC-is PDUs from the node B to a serving radio network controller (SRNC) by using E-DCH data frames over an Iub interface (an interface between the node B and the serving radio network controller (SRNC)) and an Iur interface (an interface between the SRNC and the control RNC). When a media access control-improved protocol data unit (MAC-i PDU) or a media access control-enhanced protocol data unit (MAC-e PDU) is received, this protocol data unit is de-multiplexed into media access control data streams (MAC-d streams), then these MAC-d streams are transmitted in one time on separate transport bearers by using the E-DCH uplink data frame type 1 or the E-DCH uplink data frame type 2.

The SRNC receives the E-DCH data frames, decodes the FSN of the data frames in the frame header of this data frame and observes the transmission network layer data delivery condition in a single carrier, such as whether there exists the loss of the E-DCH frame protocol data frame. Frequent disordering delivery will cause the congestion of the transmission network layer, and it affects the execution of the whole system.

With the development of technologies, it is desired that the dual-carrier technology (this technology enables a terminal to transmit data on two carriers, thus enabling the multiplexing of the uplink data rate) to be introduced into the existing system, and the industry has reached an consensus that the data streams based on two carriers should be combined to be executed in the SRNC. If the current E-DCH data frame is used, it will cause the following problems:

Node B receives the MAC-es PDU or MAC-is PDU on two carriers from a Uu port to the Iub port. However, the E-DCH frame protocol data frame in the prior art is directed to the MAC-es PDU or MAC-is PDU on one carrier. When bearing the MAC-es PDU or MAC-is PDU on two carriers, the carrier characteristic of the data stream needs to be exhibited so that the SRNC can obtain the data stream based on carrier characteristic to perform the function control regarding carrier characteristic better. Thus, it is unable to use the E-DCH frame protocol data frame in the prior art. If the node B receives the MAC-e PDU or the MAC-i PDU on two carriers and there enters one E-DCH protocol data frame, that is, the MAC-e PDU or the MAC-i PDU on these two carriers uses the same FSN, then significant modification must be made to the current E-DCH frame protocol data frame. Therefore, this method is undesirable.

Furthermore, the outer loop power control (OLPC) is calculated on the basis of the retransmission data of HARQ of the frame header of the E-DCH frame protocol data frame. If the MAC-e PDU or the MAC-i PDU on two carriers uses the same FSN, then the current E-DCH frame protocol data frame is unable to indicate which carrier information field does the data stream belong to, and the SRNC is also unable to know which carrier does the corresponding MAC-e PDU or MAC-i PDU transmit on. Thus it is unable to perform OLPC.

Consequently, on the basis that the dual-carrier data is not transmitted in the same frame protocol data frame, the present invention provides a method for setting and acquiring a frame sequence number of the enhanced-dedicated transport channel frame protocol. This method can be used in the E-DCH data frame transmission process between an IUb (an interface between the node B and a serving radio network controller (SNRC)) and an Iur port (an interface between the SRNC and the control RNC) which use the high speed packet access technology to transmit data on dual-carrier in a radio communication system. This method is used for setting and acquiring FSN based on the carrier, and for giving the SRNC a better angle to observe the transmission network layer data delivery status in dual-carrier situation so as to detect the problem of the protocol frame data frame loss.

For the problem that if the MAC-e PDU or the MAC-i PDU on two carriers uses the same FSN, then the E-DCH frame protocol data frame is unable to indicate the data stream belongs to which carrier information field and the SRNC is also unable to know the delivery of the corresponding MAC-e PDU or MAC-i PDU is on which carrier and thus unable to perform OLPC, no effective solution is proposed in the related art.

SUMMARY OF THE INVENTION

The present invention is proposed to solve the problem in the related art that if the MAC-e PDU or the MAC-i PDU on two carriers uses the same FSN, then the E-DCH frame protocol data frame is unable to inform the data stream belongs to which carrier information field and the SRNC is also unable to know the delivery of the corresponding MAC-e PDU or MAC-i is on which carrier and thus unable to perform OLPC. Therefore, the main object of the present invention is to provide a method for transmitting frame sequence numbers and a node B and a serving radio network controller to solve the above problem.

In order to achieve the above object, a method for transmitting frame sequence numbers is provided according to one aspect of the present invention.

The method for transmitting frame sequence numbers according to the present invention comprises: a node B receiving a protocol data unit from a carrier and de-multiplex the protocol data unit into media access control data streams; the node B setting a carrier indicator field in an enhanced-dedicated transport channel data frame to the carrier and generating a frame sequence number for the enhanced-dedicated transport channel data frame transmitted each time on the carrier; and the node B transmitting the media access control data streams to a serving radio network controller (SRNC) by using the enhanced-dedicated transport channel data frame.

Preferably, the protocol data unit is a media access control-enhanced sublayer MAC-e or a media access control-improved sublayer MAC-i. If the protocol data unit is the MAC-e, then the media access control data streams being transmitted to the SRNC by using the enhanced-dedicated transport channel data frame comprising: the media access control data streams being transmitted to the SRNC by using enhanced-dedicated transport channel data frame type I; and if the protocol data unit is the MAC-i, then the media access control data streams being transmitted to the SRNC by using the enhanced-dedicated transport channel data frame including: the media access control data streams being transmitted to the SRNC by using enhanced-dedicated transport channel data frame type II.

Preferably, this method uses the following methods to generate a frame sequence number for the enhanced-dedicated transport channel data frame transmitted each time on the carrier: for every frame protocol data frame transmission on one carrier, the X bit frame sequence number corresponding to this carrier is calculated according to the following formula:

frame sequence number=(frame sequence number+1) modulo $2^X$.

Preferably, the node B places a carrier indicator field of the enhanced-dedicated transport channel data frame in the spare extension fields or the spare fields of the enhanced-dedicated transport channel data frame.

Preferably, after the node B has transmitted the media access control data streams to the SRNC by using the enhanced-dedicated transport channel data frame, the method further comprises: the SRNC obtaining the carrier identifier from the enhanced-dedicated transport channel data frame; and the SRNC obtaining a frame sequence number value from the enhanced-dedicated transport channel data frame, with the frame sequence number value being the frame sequence number value of the carrier indicated by the carrier identifier.

In order to achieve the above object, a node B and a serving radio network controller are provided according to another aspect of the present invention.

This node B comprises: a first configuration module, configured to set a carrier indicator field of an enhanced-dedicated transport channel data frame to a carrier; and a second configuration module, configured to set the enhanced-dedicated transport channel data frame to generate a frame sequence number.

Preferably, the second configuration module is configured to set to generate a frame sequence number for the enhanced-dedicated transport channel data frame transmitted each time on the carrier.

Preferably, the second configuration module being configured to set to generate a frame sequence number for the enhanced-dedicated transport channel data frame transmitted each time on the carrier includes using the following methods to generate a frame sequence number: for every frame protocol data frame transmission from one carrier, the X bit frame sequence number corresponding to this carrier is calculated according to the following formula:

frame sequence number=(frame sequence number+1) modulo $2^X$.

This serving radio network controller SRNC comprises: a first resolution module, configured to resolve the carrier identifier from a carrier indicator field of an enhanced-dedicated transport channel data frame; and a second resolution module, configured to resolve a frame sequence number value from a frame sequence number field of the enhanced-dedicated transport channel data frame, with the frame sequence number value being the frame sequence number value of the carrier indicated by the carrier identifier.

Preferably, the SRNC further comprises: a detecting module, configured to detect frame loss by using the frame sequence number value.

A data frame, comprises: a carrier indicator field, wherein the carrier indicator field is used for indicating a carrier in a dual-carrier.

Preferably, the carrier indicator field is placed in the spare extension fields or the spare fields of the data frame.

In the present invention, a node B receives a protocol unit from a carrier and de-multiplexes the protocol data unit into media access control data streams; the node B sets a carrier indicator field in an enhanced-dedicated transport channel data frame to a carrier and generates a frame sequence number for the enhanced-dedicated transport channel data frame transmitted each time on the carrier; and the node B transmits the media access control data streams to a serving radio network controller SRNC by using the enhanced-dedicated transport channel data frame. This method solves the problem that if the MAC-e PDU or the MAC-i PDU on two carriers uses the same FSN, then the E-DCH frame protocol data frame is unable to inform the data stream belongs to which carrier information field and the SRNC is also unable to know the delivery of the corresponding MAC-e PDU or MAC-i PDU is on which carrier and thus unable to perform OLPC. Thus, this method achieves the effect that the SRNC is able to learn the transmission network layer data delivery status better in dual-carrier situation so as to detect the frame loss of the frame protocol data.

BRIEF DESCRIPTION OF THE DRAWINGS

The drawings illustrated here provide a further understanding of the present invention and form a part of the present application. The exemplary embodiments and the description thereof are used to explain the present invention, and do not constitute undue limitation of the present invention. In the drawings.

DETAILED DESCRIPTION OF EMBODIMENTS

Considering that if MAC-e PDUs or MAC-i PDUs on two carriers use a same FSN, then the E-DCH frame protocol data frames are unable to inform which carrier information fields the data streams belong to, and the SRNC is also unable to know the delivery of the corresponding MAC-e PDUs or MAC-i PDUs is on which carrier and thus unable to perform OLPC, the embodiments of the present invention provide a method for transmitting frame sequence numbers and a node B and a serving radio network controller. The method comprises: a node B receiving a protocol data unit from a carrier and de-multiplexing the protocol data unit into media access control data streams; the node B setting a carrier indicator field in an enhanced-dedicated transport channel data frame field to a carrier and generating a frame sequence number for the enhanced-dedicated transport channel data frame transmitted each time on the carrier; and the node B transmitting the media access control data streams to a serving radio network controller (SRNC) by using the enhanced-dedicated transport channel data frame.

It needs to be noted that the embodiments of the present application and the features of the embodiments can be combined with each other if there is no conflict. The present invention will be described hereinafter in detail with reference to the drawings and in combination with the embodiments.

Method Embodiments

Figure 2:
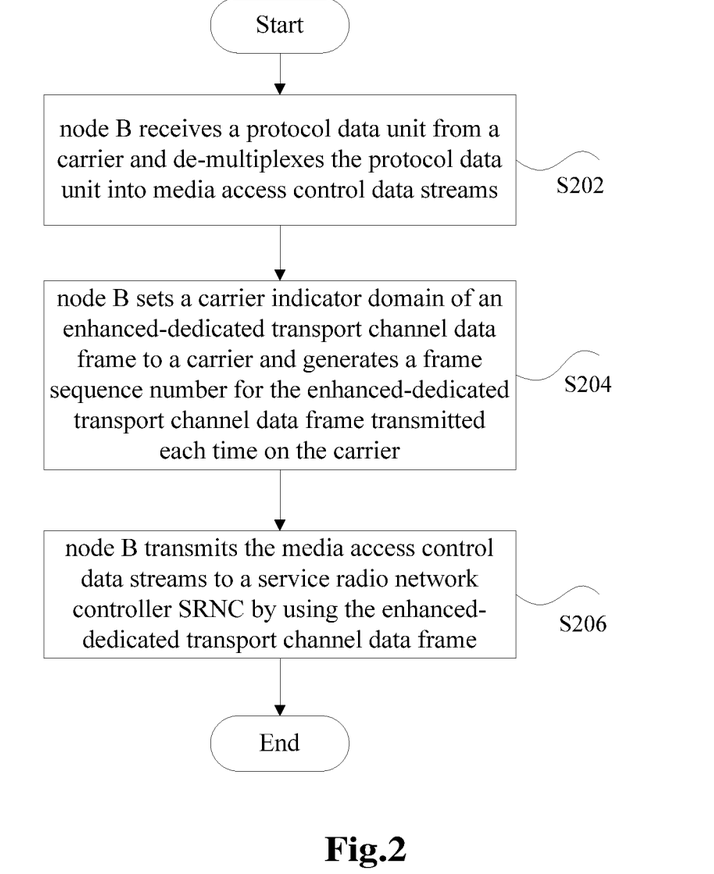
FIG. 2 is a flow chart of a method for transmitting frame sequence numbers according to the embodiments of the present invention.

A method for transmitting frame sequence numbers is provided according to the embodiments of the present invention. FIG. 2 is a flow chart of a method for transmitting frame sequence numbers according to the embodiments of the present invention. As shown in FIG. 2, this method comprises the following steps S202 to S206:

Step S202: A node B receives a protocol data unit from a carrier and de-multiplexes the protocol data unit into media access control data streams;

Step S204: The node B sets a carrier indicator field in an enhanced-dedicated transport channel data frame to the carrier and generates a frame sequence number for the enhanced-dedicated transport channel data frame transmitted each time on the carrier; and Step S206: The node B transmits the media access control data streams to a serving radio network controller SRNC by using the enhanced-dedicated transport channel data frame.

Hereinafter, the implementation process of the embodiments of the present invention will be described in detail in combination with examples.

Take dual-carrier for example:

A dual-carrier includes a carrier of a high speed dedicated physical control channel (HS-DPCCH) as the main carrier, and the other carrier in the dual-carrier is the subordinate carrier.

Part One: Rules

Definition of Frame sequence number (FSN):

For the E-DCH data frame delivered each time from one carrier, it has to generate its own FSN.

Setting: for transmission of every frame protocol data frame from one carrier, the X bit FSN corresponding to this carrier is calculated according to the following formula (X is greater than or equal to 4):

$$FSN=(FSN+1) \mod 2^X$$

E-DCH data frame structure: a "carrier indicator" field is added into the structure, indicating which carrier in a dual-carrier.

The placement location of the "carrier indicator" field: the spares or the spare extensions in the E-DCH data frame structure.

Part Two: Processing of the Node B

When a MAC-e or a MAC-i protocol data unit is received from one carrier, this protocol data unit is de-multiplexed into MAC-d streams, and then every MAC-d stream is transmitted to a RNC on their respective transport bearers by using E-DCH data frame type 1 (MAC-e) or type 2 (MAC-i).

In this case:

1. The Node B sets the carrier indicator:

The "carrier indicator" field in the frame structure of the E-DCH data frame is set to this carrier;

2. The Node B sets the FSN:

For the E-DCH data frame delivered each time from one carrier, it has to generate its own FSN.

Setting: for every frame protocol data frame transmission from one carrier, the X bit FSN corresponding to this carrier is calculated according to the following formula (X is greater than or equal to 4):

$$FSN=(FSN+1) \mod 2^X$$

3. The Node B transmits the E-DCH data frame to an SRNC:

The E-DCH data frame transmits the MAC-es PDU or MAC-is PDU received from a carrier including the "carrier indicator" field indicator to the CRNC or SRNC.

Part Three: Processing of SRNC

The SRNC receives E-DCH uplink data frame type 1 (MAC-e) or type 2 (MAC-i) including the corresponding MAC-d streams from the node B on separate transport bearers.

The SRNC receives the E-DCH data frame from the node B;

The SRNC resolves the carrier identifier in the "carrier identifier" field of the E-DCH data frame;

The SRNC solves the FSN value from the "FSN" field of the E-DCH data frame and obtains the FSN for the carrier indicated by the carrier identifier;

The SRNC uses the FSN to detect frame loss.

Setting scenario: a terminal uses the dual-carrier technology (this technology enables the terminal to transmit data on two carriers and thus enables the uplink data rate to be multiplexed). The carrier including an HS-DPCCH channel in a dual-carrier is the main carrier, and the other carrier in the dual-carrier is the subordinate carrier.

Embodiment I provides illustration of the structure 1 of E-DCH uplink data frame type 1 in the present invention, as shown in FIG. 2.

One bit in one of the spare fields of the existing E-DCH uplink data frame type 1 is changed to the following field:

Carrier indicator

The corresponding relation between the field mapping values and the main and subordinate carriers is as shown in Table 1.

TABLE 1

| carrier indicator field encoding value | logic meaning |
| --- | --- |
| 0 | main carrier in dual-carrier |
| 1 | subordinate carrier in dual-carrier |

What is placed in the "FSN" field is the corresponding FSN value of the carrier indicated by the "carrier indicator" field. The other fields are the same as those in the prior art.

Figure 3:
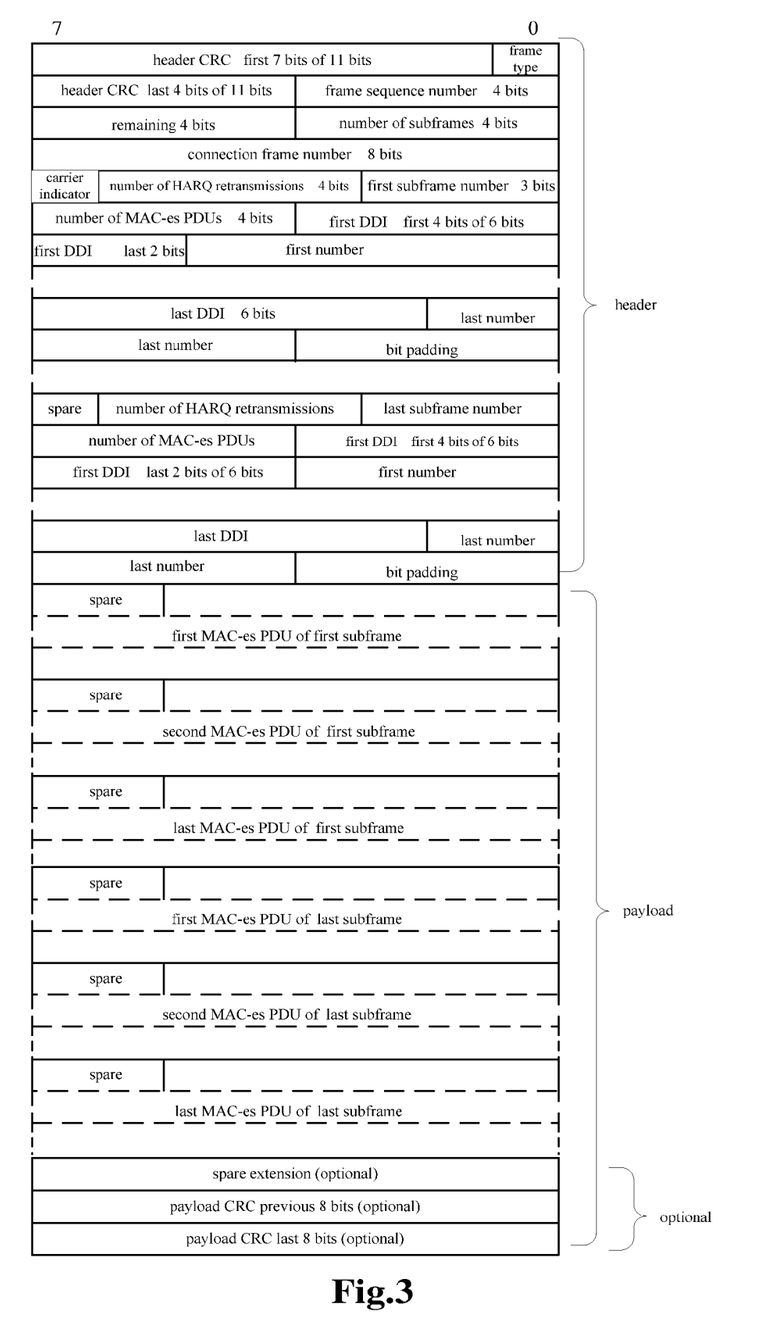
FIG. 3 is a schematic diagram of structure 1 of E-DCH uplink data frame type 1 according to the embodiments of the present invention.

Embodiment II provides illustration of the structure 2 of E-DCH uplink data frame type 1 in the present invention, as shown in FIG. 3.

One bit in one of the spare extension fields of the existing E-DCH uplink data frame type 1 is changed to the following field:

Carrier indicator

The corresponding relation between the field mapping values and the main and subordinate carriers is as shown in Table 1.

What is placed in the "FSN" field is the corresponding FSN value of the carrier indicated by the "carrier indicator" field. The other fields are the same as those in the prior art.

Figure 4:
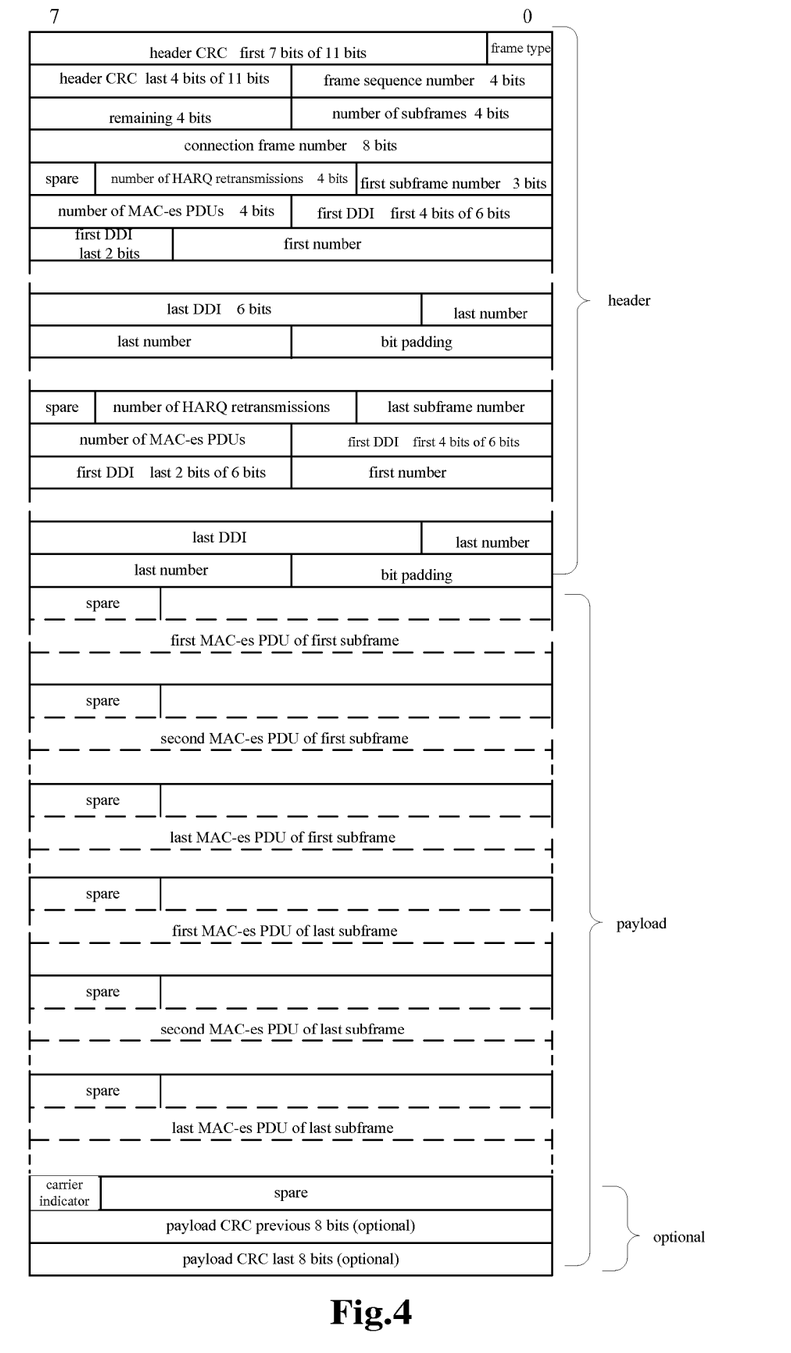
FIG. 4 is a schematic diagram of structure 2 of E-DCH uplink data frame type 1 according to the embodiments of the present invention.

Embodiment III provides illustration of the structure 1 of E-DCH uplink data frame type 2 in the present invention, as shown in FIG. 4.

One bit in one of the spare fields of the existing E-DCH uplink data frame type 2 is changed to the following field:

Carrier indicator

The corresponding relation between the field mapping values and the main and subordinate carriers is as shown in Table 1.

What is placed in the "FSN" field is the corresponding FSN value of the carrier indicated by the "carrier indicator" field. The other fields are the same as those in the prior art.

Embodiment IV

Figure 5:
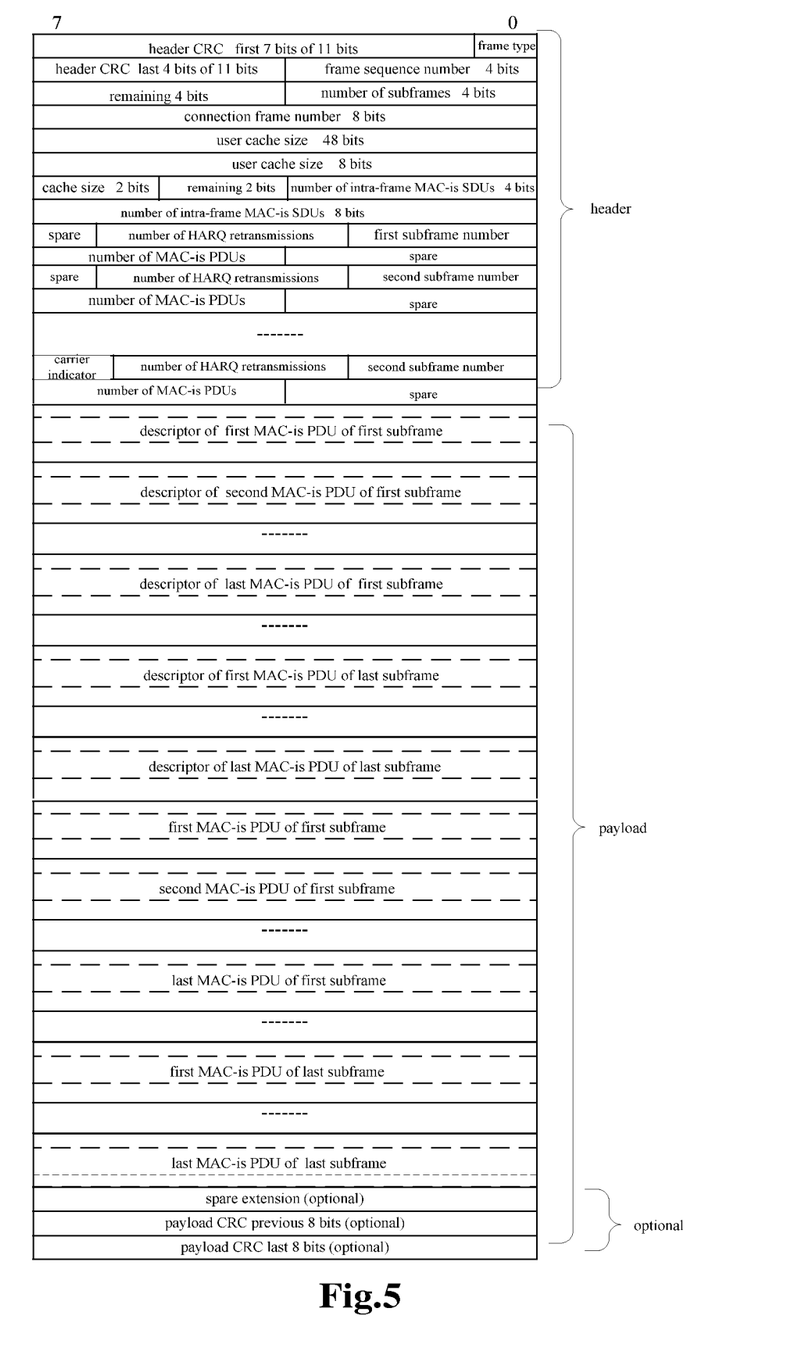
FIG. 5 is a schematic diagram of structure 1 of E-DCH uplink data frame type 2 according to the embodiments of the present invention.

This embodiment provides illustration of the structure 1 of E-DCH uplink data frame type 2 in the present invention, as shown in FIG. 5.

One bit in one of the spare extension fields of the existing E-DCH uplink data frame type 2 is changed to the following field:

Carrier indicator

The corresponding relation between the field mapping values and the main and subordinate carriers is as shown in Table 1.

What is placed in the "FSN" field is the corresponding FSN value of the carrier indicated by the "carrier indicator" field. The other fields are the same as those in the prior art.

Embodiment V

Figure 6:
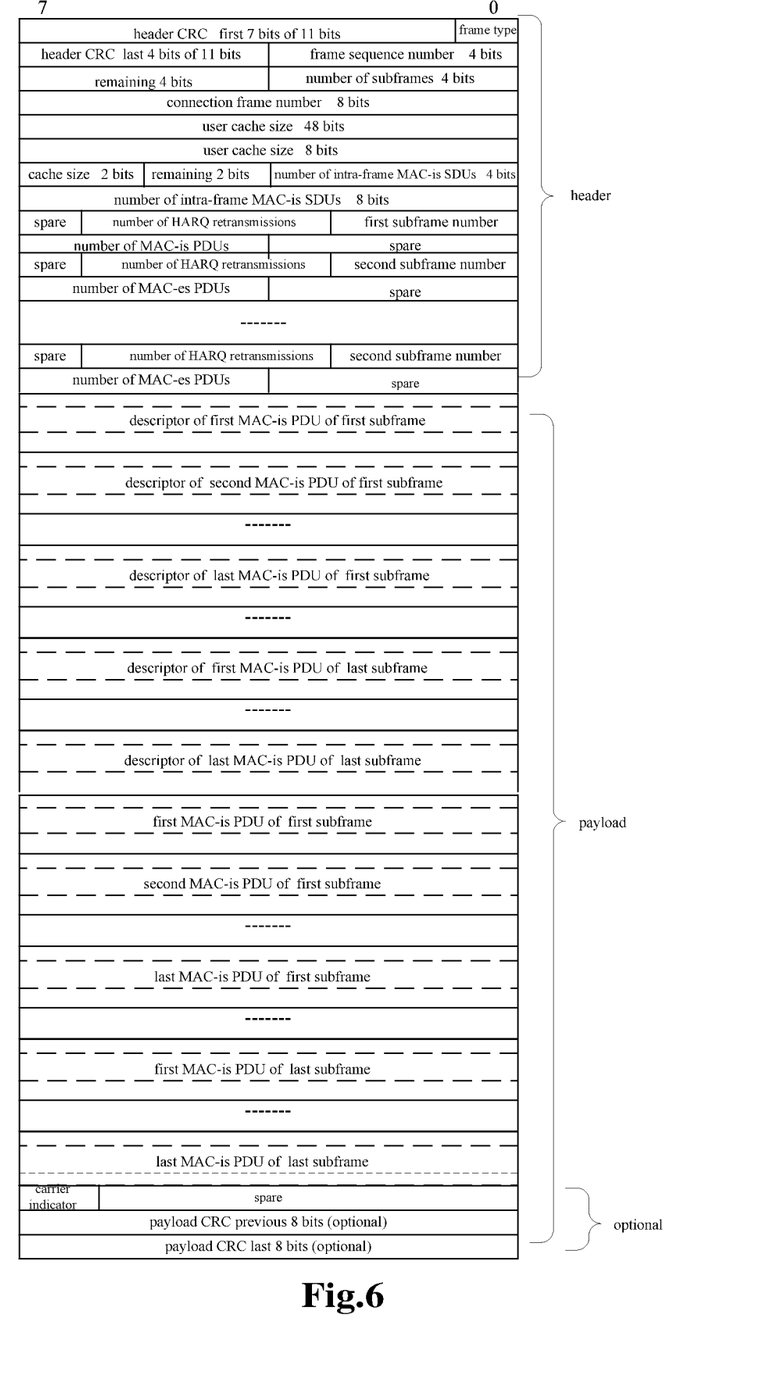
FIG. 6 is a schematic diagram of structure 2 of E-DCH uplink data frame type 2 according to the embodiments of the present invention.

This embodiment provides the process of the node B of the embodiments of the present invention by using the E-DCH data frame structure in embodiment 1 or embodiment 3, as shown in FIG. 6.

Step 510: the Node B receives a MAC-e or a MAC-i protocol data unit from one certain carrier.

Step 520: the Node B fills the "carrier indicator" field by using the E-DCH data frame structure in embodiment 1 or embodiment 3.

The Node B receives a MAC-e protocol data unit from one certain carrier (main or subordinate), then the structure 1 of E-DCH uplink data frame type 1 in embodiment 1 is used to fill the "carrier indicator" field. If it is the main carrier, then write the mapping value of the "carrier indicator" field as 0; if it is the subordinate carrier, then write the mapping value of the "carrier indicator" field as 1. Or, the node B receives a MAC-i protocol data unit from one certain carrier (main or subordinate), then the structure 1 of E-DCH uplink data frame type 2 in embodiment 3 is used to filled the "carrier indicator" field. If it is the main carrier, then write the mapping value of the "carrier indicator" field as 0; if it is the subordinate carrier, then write the mapping value of the "carrier indicator" field as 1.

Step 530: calculate and set the corresponding FSN field of the carrier indicated by the "carrier indicator" field.

When X is equal to 4 and the current value of FSN is 6, calculate a new FSN according to the following formula:

FSN=(FSN+1)modulo 16

The new FSN is equal to (6+1) modulo 16. That is, the value of the new FSN is 7.

Fill the corresponding FSN field of the carrier indicated by the "carrier indicator" field with 7.

Step 540: incorporate the MAC-es PDU or MAC-is PDU received on the carrier indicated by the "carrier indicator" field.

The Node B receives a MAC-e protocol data unit from one certain carrier, and uses the MAC-es PDU received on the carrier indicated by the "carrier indicator" field of structure 1 of E-DCH uplink data frame type 1 in embodiment 1. Or the node B receives a MAC-i protocol data unit from one certain carrier, and uses the MAC-is PDU received on the carrier indicated by the "carrier indicator" field of structure 1 of E-DCH uplink data frame type 2 in embodiment 3.

Step 550: the Node B transmits this frame protocol data frame to the CRNC or the SRNC.

If the CRNC is connected to the node B, then the node B transmits this frame protocol data frame to the CRNC and the CRNC further needs to forward this frame protocol data frame to SRNC via an Iur interface. If SRNC is connected to the node B, then the node B directly transmits this frame protocol data frame to SRNC.

Embodiment VI

Figure 7:
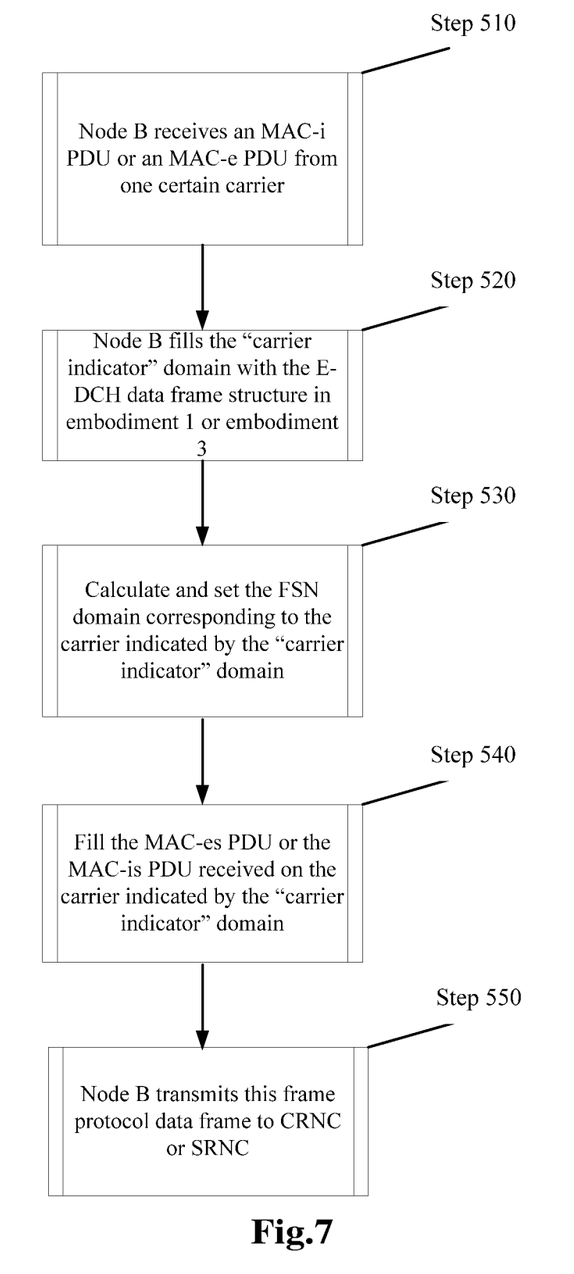
FIG. 7 is a preferred flow chart of a node B process according to the embodiments of the present invention.
Figure 8:
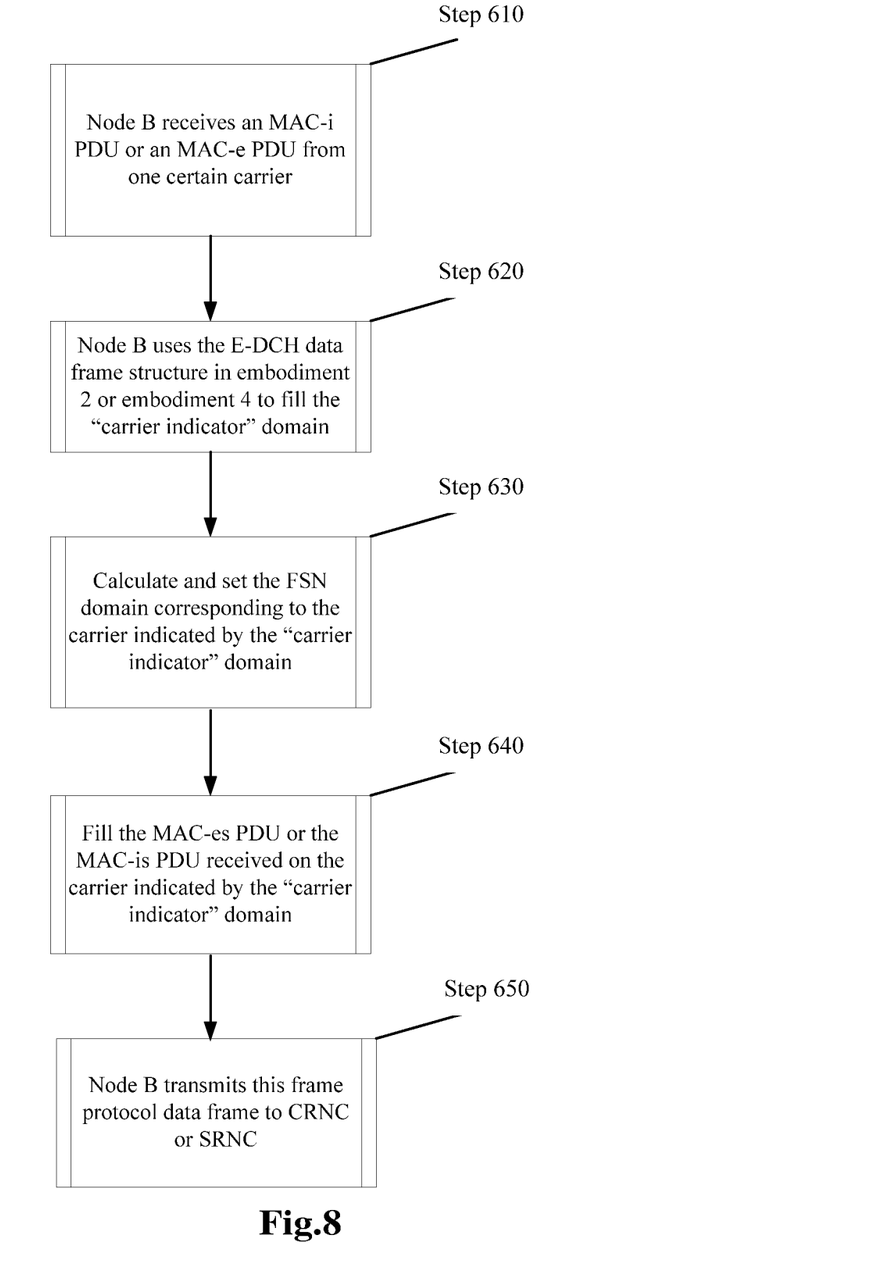
FIG. 8 is a preferred flow chart of a node B process according to the embodiments of the present invention.

This embodiment provides a process of the node B of the present invention by using the E-DCH data frame structure in embodiment 2 or embodiment 4, as shown in FIG. 7.

Step 610: the node B receives a MAC-e or a MAC-i protocol data unit from one certain carrier.

Step 620: the Node B fills the "carrier indicator" field by using the E-DCH data frame structure in embodiment 2 or embodiment 4.

The node B receives a MAC-e protocol data unit from one certain carrier (main or subordinate carrier), then the structure 2 of E-DCH uplink data frame type 1 in embodiment 2 is used to fill the "carrier indicator" field. If it is the main carrier, then write the mapping value of the "carrier indicator" field as 0; if it is the subordinate carrier, then write the mapping value of the "carrier indicator" field as 1. Or, the node B receives a MAC-i protocol data unit from one certain carrier (main or subordinate carrier), then the structure 2 of E-DCH uplink data frame type 2 in embodiment 4 is used to filled the "carrier indicator" field. If it is the main carrier, then write the mapping value of the "carrier indicator" field as 0; if it is the subordinate carrier, then write the mapping value of the "carrier indicator" field as 1.

Step 630: Calculate and set the corresponding FSN field of the carrier indicated by the "carrier indicator" field.

When X is equal to 5 and the current value of FSN is 15, calculate a new FSN value according to the following formula:

FSN=(FSN+1)modulo 32

The new FSN is equal to (15+1) modulo 32. That is, the value of the new FSN is 15.

Fill the corresponding FSN field of the carrier indicated by the "carrier indicator" field with 0.

Step 640: incorporate the MAC-es PDU or MAC-is PDU received on the carrier indicated by the "carrier indicator" field.

The Node B receives a MAC-e protocol data unit from one certain carrier, and uses the MAC-es PDU received on the carrier indicated by the "carrier indicator" field of structure 1 of E-DCH uplink data frame type 1 in embodiment 1. Or, the node B receives a MAC-i protocol data unit from one certain carrier, and uses the MAC-is PDU received on the carrier indicated by the "carrier indicator" field of structure 2 of E-DCH uplink data frame type 2 in embodiment 3.

Step 650: the node B transmits this frame protocol data frame to the CRNC or the SRNC.

If the CRNC is connected to the node B, then the node B transmits this frame protocol data frame to the CRNC and the CRNC further needs to forward this frame protocol data frame to the SRNC via an Iur interface. If the SRNC is connected to the node B, then the node B directly transmits this frame protocol data frame to the SRNC.

Embodiment VII

Figure 9:
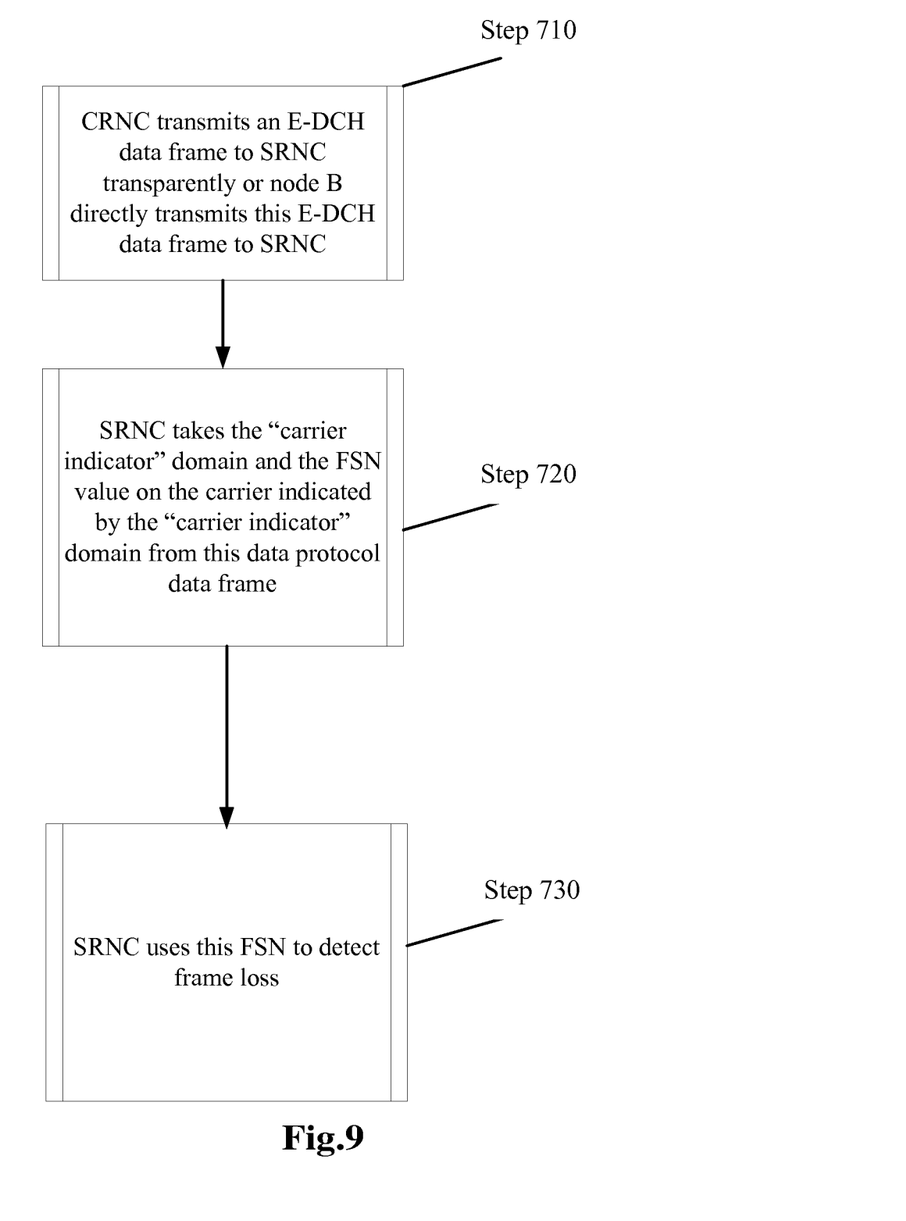
FIG. 9 is a preferred flow chart of an SRNC process according to the embodiments of the present invention.

This embodiment provides a process of the SRNC of the present invention.

Step 710: the SRNC receives a frame protocol data frame from the node B or CRNC side.

Step 720: the SRNC decodes a carrier indicator value from the "carrier indicator" field of this frame protocol data frame, and decodes a FSN value of the carrier indicated by the carrier indicator value from the "FSN" field.

Step 730: the SRNC uses this FSN to detect frame loss.

In summary, the present invention provides a method for sending frame sequence numbers of a frame protocol of an enhanced-dedicated processing channel.

In this method, when the node B receives the data on one certain carrier simultaneously, it first sets the FSN field of one E-DCH data frame to be the FSN on this carrier on an Iub or Iur transmission channel bearer, and transmits this data frame to the SRNC to give the SRNC a better angle to observe the transmission network layer data delivery status in dual-carrier or multi-carrier situation so as to detect the frame loss of protocol data frames. In this method, the E-DCH data frame only includes the MAC-es PDU or MAC-is PDU received from this carrier.

Apparatus Embodiments

A node B and a serving radio network controller are provided according to the embodiments of the present invention.

Figure 10:
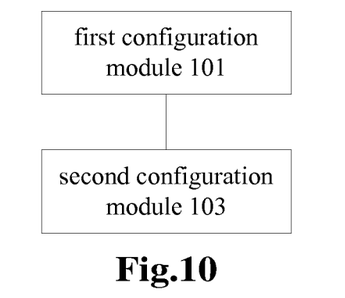
FIG. 10 is a schematic diagram of a node B according to the embodiments of the present invention.

FIG. 10 is a schematic diagram of a node B according to the embodiments of the present invention.

As shown in FIG. 10, this node B comprises: a first configuration module 101 and a second configuration module 103.

In particular, the first configuration module 101 is used for setting a carrier indicator field of an enhanced-dedicated transport channel data frame to a carrier; and the second configuration module 103 is used for setting the enhanced-dedicated transport channel data frame to generate a frame sequence number.

Preferably, the second configuration module 103 is in particular used for setting to generate a frame sequence number for the enhanced-dedicated transport channel data frame transmitted each time on the carrier.

Preferably, the second configuration module 103 is in particular used for setting to generate a frame sequence number for the enhanced-dedicated transport channel data frame transmitted each time on the carrier. The second configuration module 103 uses the following method to generate a frame sequence: for every frame protocol data frame transmission from one carrier, the X bit frame sequence number corresponding to this carrier is calculated according to the following formula:

$$\text{frame sequence number} = (\text{frame sequence number} + 1) \text{ modulo } 2^X.$$

Figure 11:
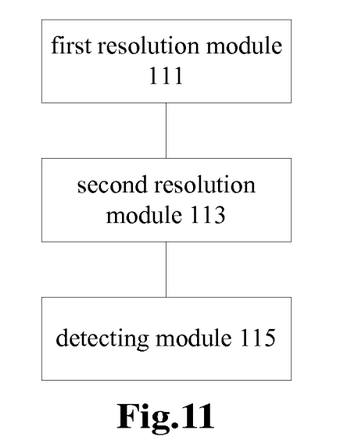
FIG. 11 is a schematic diagram of a serving radio network controller according to the embodiments of the present invention.

FIG. 11 is a schematic diagram of a serving radio network controller according to the embodiments of the present invention.

As shown in FIG. 11, this serving radio network controller comprises: a first resolution module 111 and a second resolution module 113.

In particular, the first resolution module 111 is used for resolving the carrier identifier from a carrier indicator field of an enhanced-dedicated transport channel data frame; and the second resolution module 113 is used for resolving the frame sequence number value from a frame sequence number field of the enhanced-dedicated transport channel data frame, with the frame sequence number value being the frame sequence number value of the carrier indicated by the carrier identifier.

Preferably, the SRNC further comprises: a detecting module 115 for detecting frame loss by using frame sequence number values.

The above data frame can comprise a carrier indicator field, with the carrier indicator field being used for indicating a carrier in a dual-carrier.

The above carrier indicator field is placed in the spare extension field of the data frame.

It can be seen from the above description that the method for sending frame sequence numbers of the protocol frame of the enhanced dedicated processing channel of the embodiments of the present invention has the following technical effects: the FSN field is based on carrier characteristic, thus it avoids to establish double AAL2 establishment procedure and double transport bearer management, reduces relevant processing load and delay, and does not need double TNL address; it does not change the E-DCH data frame structure in the prior art and only uses the spare field or the spare extension field to add a "carrier indicator" field for identifying carriers and makes very little change on the E-DCH data frame structure; it is compatible with the prior art and any improved technologies thereof; additionally it is able to clearly indicate the FSN value of one certain carrier. This method solves the problem that the FSN setting speed in a dual-carrier system goes too fast. And it also solves the data frame loss caused by the FSN value without carrier characteristic being the same, which is resulted from the E-DCH data frame structure being unable to carry the FSN information based on the carrier.

Above description is only to illustrate the preferred embodiments, and not to limit the present invention. To those skilled in the art, various alterations and changes can be made to the present invention. The scope defined in the present invention shall comprise any modification, equivalent substitution and improvement within the basic idea and principle of the present invention.

What is claimed is:

1. A method for transmitting a frame sequence number, comprising: a node B receiving a protocol data unit from a carrier and de-multiplexing the protocol data unit into media access control data streams;
   the node B setting a carrier indicator field in an enhanced-dedicated transport channel data frame to the carrier and generating a frame sequence number for the enhanced-dedicated transport channel data frame transmitted each time on the carrier, wherein, for every frame protocol data frame transmission from the carrier, an X-bit frame sequence number corresponding to this carrier is calculated according to the following formula:

$$\text{frame sequence number} = (\text{frame sequence number} + 1) \text{ modulo } 2^X,$$

wherein $X \geq 4$; and
   the node B transmitting the media access control data streams to a serving radio network controller (SRNC) by using the enhanced-dedicated transport channel data frame.

2. The method according to claim 1, the protocol data unit is a media access control-enhanced sublayer MAC-e or a media access control-improved sublayer MAC-i, wherein,
   if the protocol data unit is the MAC-e, then the media access control data streams being transmitted to the SRNC by using the enhanced-dedicated transport channel data frame including:
   the media access control data streams being transmitted to the SRNC by using enhanced-dedicated transport channel data frame type I;
   if the protocol data unit is the MAC-i, then the media access control data streams being transmitted to the SRNC by using the enhanced-dedicated transport channel data frame including:
   the media access control data streams being transmitted to the SRNC by using enhanced-dedicated transport channel data frame type II.

3. The method according to claim 1, wherein the node B places the carrier indicator field of the enhanced-dedicated transport channel data frame in spare extension fields or spare fields of the enhanced-dedicated transport channel data frame.

4. The method according to claim 1, wherein after the node B has transmitted the media access control data streams to the SRNC by using the enhanced-dedicated transport channel data frame, the method further comprises:
- the SRNC obtaining a carrier identifier from the enhanced-dedicated transport channel data frame; and
- the SRNC obtaining a frame sequence number value from the enhanced-dedicated transport channel data frame, with the frame sequence number value being the frame sequence number value of the carrier indicated by the carrier identifier.

5. A node B, comprising:
- a first configuration module, configured to set a carrier indicator field of an enhanced-dedicated transport channel data frame to a carrier; and
- a second configuration module, configured to set the enhanced-dedicated transport channel data frame to generate a frame sequence number, wherein, for every frame protocol data frame transmission from the carrier, an X-bit frame sequence number corresponding to this carrier is calculated according to the following formula:

$$\text{frame sequence number} = (\text{frame sequence number} + 1) \text{ modulo } 2^X,$$

wherein $X \geq 4$.

6. The node B according to claim 5, wherein the second configuration module is configured to set to generate a frame sequence number for the enhanced-dedicated transport channel data frame transmitted each time on the carrier.

7. A serving radio network controller SRNC, comprising:
- a first resolution module, configured to resolve a carrier identifier from a carrier indicator field of an enhanced-dedicated transport channel data frame; and
- a second resolution module, configured to resolve a frame sequence number value from a frame sequence number field of the enhanced-dedicated transport channel data frame, with the frame sequence number value being the frame sequence number value of the carrier indicated by the carrier identifier, wherein, for every frame protocol data frame transmission from the carrier, an X-bit frame sequence number corresponding to this carrier is calculated according to the following formula:

$$\text{frame sequence number} = (\text{frame sequence number} + 1) \text{ modulo } 2^X,$$

wherein $X \geq 4$.

8. The SRNC according to claim 7, wherein the SRNC further comprises:
- a detecting module, configured to detect frame loss by using the frame sequence number value.

9. The method according to claim 2, wherein the node B places the carrier indicator field of the enhanced-dedicated transport channel data frame in spare extension fields or spare fields of the enhanced-dedicated transport channel data frame.

10. The method according to claim 1, wherein the node B places the carrier indicator field of the enhanced-dedicated transport channel data frame in spare extension fields or spare fields of the enhanced-dedicated transport channel data frame.

11. The method according to claim 2, wherein after the node B has transmitted the media access control data streams to the SRNC by using the enhanced-dedicated transport channel data frame, the method further comprises:
- the SRNC obtaining a carrier identifier from the enhanced-dedicated transport channel data frame; and
- the SRNC obtaining a frame sequence number value from the enhanced-dedicated transport channel data frame, with the frame sequence number value being the frame sequence number value of the carrier indicated by the carrier identifier.

12. The method according to claim 1, wherein after the node B has transmitted the media access control data streams to the SRNC by using the enhanced-dedicated transport channel data frame, the method further comprises:
- the SRNC obtaining a carrier identifier from the enhanced-dedicated transport channel data frame; and
- the SRNC obtaining a frame sequence number value from the enhanced-dedicated transport channel data frame, with the frame sequence number value being the frame sequence number value of the carrier indicated by the carrier identifier.

* * * * *